United States Patent
Ylitalo et al.

(10) Patent No.: US 8,041,939 B2
(45) Date of Patent: Oct. 18, 2011

(54) ADDRESSING AND ROUTING MECHANISM FOR WEB SERVER CLUSTERS

(75) Inventors: Jukka Ylitalo, Espoo (FI); Petri Jokela, Espoo (FI); Jan Melèn, Espoo (FI); Raimo Vuopionperä, Espoo (FI)

(73) Assignee: Telefonaktiebolaget L M Ericsson (publ) (SE)

( * ) Notice: Subject to any disclaimer, the term of this patent is extended or adjusted under 35 U.S.C. 154(b) by 342 days.

(21) Appl. No.: 12/300,059

(22) PCT Filed: Apr. 30, 2007

(86) PCT No.: PCT/EP2007/054221
§ 371 (c)(1),
(2), (4) Date: Mar. 18, 2009

(87) PCT Pub. No.: WO2007/131873
PCT Pub. Date: Nov. 22, 2007

(65) Prior Publication Data
US 2009/0265541 A1    Oct. 22, 2009

(30) Foreign Application Priority Data

May 11, 2006 (GB) .................................. 0609256.3

(51) Int. Cl.
*H04L 29/06* (2006.01)
*H04L 9/32* (2006.01)
(52) U.S. Cl. ........................................ 713/151; 713/171
(58) Field of Classification Search ..................... 726/12; 713/151, 153
See application file for complete search history.

(56) References Cited

U.S. PATENT DOCUMENTS 7,827,313 B2 * 11/2010 Salmela et al. ............... 709/246

OTHER PUBLICATIONS

Johnson et al., "Mobility Support in IPv6", RFC 3775, Jun. 2004, 147 pages.
Perkins, IP Mobility Support for IPv4, RFC 3220, Jan. 2002, 88 pages.
Chen et al., "A proposal to replace HIP base exchange with IKE-H method draft-yan-hip-ike-h-02", Nov. 10, 2005, 12 pages.
Moskowitz et al., "Host Identity Protocol", RFC 5201, Apr. 2008, 93 pages.

* cited by examiner

Primary Examiner — Nathan Flynn
Assistant Examiner — Sharief Megeed
(74) Attorney, Agent, or Firm — Myers Bigel Sibley & Sajovec, P.A.

(57) ABSTRACT

A method of establishing a Host Identity Protocol session between first and second Host Identity Protocol enabled hosts, where at least said second host is located behind a reverse-proxy. The method comprises providing the reverse-proxy with Diffie-Hellman public keying material of the second host, sending said Diffie-Hellman public keying material from the reverse-proxy to the first host as part of the Host Identity Protocol base exchange procedure, this material being bound to the Host Identity of the reverse-proxy for the purpose of the Host Identity Protocol session, and, at the first host, using the Host Identity of the reverse-proxy as the correspondent Host Identity for the Host Identity Protocol session, and, at the second host, using the Host Identity of the reverse-proxy as the originating Host Identity for the Host Identity Protocol session.

18 Claims, 5 Drawing Sheets

Logical new packet structure

Actual packet structure after the HIP negotiation

ADDRESSING AND ROUTING MECHANISM FOR WEB SERVER CLUSTERS

FIELD OF THE INVENTION

The present invention relates to an addressing and routing mechanism for web server clusters and in particular, though not necessarily, to an addressing and routing mechanism that allows a cluster of web servers located behind a web reverse-proxy to be reachable by a client using a single Host Identity according to the Host Identity Protocol.

DESCRIPTION OF THE RELATED ART

When the Internet was originally devised, hosts were fixed in location and there was implicit trust between users despite the lack of real security or host identification protocols, and this situation continued even upon wider uptake and use of the technology. There was little need to consider techniques for dealing with host mobility since computers were relatively bulky and immobile.

With the revolution in telecommunications and computer industry in the early 1990's, smaller communication equipment and computers became more widely available and the invention of the World Wide Web, and all the services that emerged with it, finally made the Internet attractive for the average person. The combination of increasing usage of the network and mobile telecommunications created the need for secure mobility management in the Internet.

The increasing number of involved parties, and the monetary transactions that were needed for certain services, also created a need for added application level security. Currently, the most widely used encryption protocols, for example SSL/TLS, are running within the upper network layers, for example TCP.

Taking into account the above mobility management and security issues, the Mobile IP standard (C. Perkins, "IP Mobility Support for IPv4", RFC 3220, IETF, 2002) and the Mobile IPv6 standard (D. Johnson, C. Perkins, J. Arkko, "Mobility Support in IPv6", RFC3775, IETF 2004) have been introduced. Together these specifications are planned to provide mobility support for the next generation Internet. Security work is developing in the form of Ipsec, and related activities such as various key exchange protocols, with the aim being to provide security in the IP layer. However, experience has shown that it is fairly hard to achieve combined security and mobility using the current standards.

An IP address describes a topological location of a node in the network. The IP address is used to route the packet from the source node to the destination. At the same time the IP address is also used to identify the node, providing two different functions in one entity. This is akin to a person responding with their home address when asked who they are. When mobility is also considered, the situation becomes even more complicated: since IP addresses act as host identifiers in this scheme, they must not be changed; however, since IP addresses also describe topological locations, they must necessarily change when a host changes its location in the network. Clearly, it is impossible to achieve both stability and dynamic changes at the same time.

In the case of Mobile IP, the solution is to use a fixed home location providing a "home address" for the node. The home address both identifies the node and provides a stable location for it when it is at home. The current location information is available in the form of a care-of address, which is used for routing purposes when the node is away from home.

Another solution to the problem is to separate the identification and location functions from each other, and this is the approach taken in the Host Identity Protocol (HIP) proposal (R. Moskowitz, P. Nikander, P. Jokela, T. Henderson, "Host Identity Protocol", Internet Draft, work in progress, draft-ietf-hip-base-05.txt, IETF, 2006). HIP separates the location and identity roles of IP addresses by introducing a new namespace, the Host Identity (HI). In HIP, the Host Identity is basically a public cryptographic key of a public-private key-pair. The public key identifies the party that holds the only copy of the private key. A host possessing the private key of the key-pair can directly prove that it "owns" the public key that is used to identify it in the network. The separation also provides a means to handle mobility and multi-homing in a secure way. In addition to the separation between location and identification, HIP provides for the negotiation of security associations (SAs) between HIP-enabled nodes.

Each HIP host can generate short-term keys to be used only for a short time. These are useful when it is not necessary for the node to be identified with the same identity later. For example, buying books from a bookstore may be a long-term relationship, while contacting a server once to collect user profiles may be considered to be a short-term action. In the latter case a short-term identity can be created to avoid more widespread dissemination of the long-term identity. The HIP Host Identity (HI), being a public key, can be quite long and is therefore not practical in all situations. In HIP, the HI is represented with a 128-bit long Host Identity Tag (HIT) that is generated from the HI by hashing it. Thus, the HIT identifies a HI. Since the HIT is 128 bits long, it can be used for IPv6 applications directly as it is exactly the same length as IPv6 addresses.

Another representation of the Host Identity is the Local Scope Identifier (LSI), which is a 32-bit representation for the Host Identity. The purpose of the LSI is to facilitate using Host Identities in existing protocols and APIs. For example, since the LSI is the same length as an IPv4 address, it can be used for IPv4 applications directly. Although much of the remainder of this description will be based around the use of the longer HIT, it will be appreciated that the same or similar considerations apply to the alternative LSI representation.

FIG. 1 of the accompanying drawings illustrates the various layers in HIP, comprising the standard transport layer 4, network layer 8 and link layer 10, with a process 2 communicating with the transport layer 4 below it. With HIP, a new Host Identity Layer 6 is disposed between the transport layer 4 and the network layer 8.

Locally, each HI and its associated HIT are mapped to the IP addresses of the node. When packets are leaving the host, the correct route is chosen (by whatever means) and corresponding IP addresses are put into the packet as the source and destination addresses. Each packet arriving from the upper layer contains the HIT of the peer as the destination address. The mapping between the HIT and the location information can be found at the HI layer 6. Hence, the destination address is converted to the mapped IP address, and the source HIT is converted to source IP address.

The mapping between a peer HIT and IP address can be retrieved by a HIP client in several ways, one of which being from a DNS server. Typically, a DNS server will receive a request from a client to resolve an Internet domain name, e.g. www.serviceprovider.com. The location information held by the DNS server can be updated by the peer node any time.

HIP defines a base message exchange containing four messages, a four-way handshake, and this is used to create a security association (SA) between HIP-enabled hosts. During the message exchange, the Diffie-Hellman procedure is used to create a session key and to establish a pair of IPsec Encapsulating Security Payload (ESP) Security Associations (SAs) between the nodes. FIG. 2 of the accompanying drawings illustrates the operation of the four-way handshake. The negotiating parties are referred to as the "Initiator", starting the connection, and the "Responder". The Initiator begins the negotiation by sending an I1 packet that contains the HITs of the nodes participating in the negotiation. The destination HIT may also be zeroed, if the Responder's HIT is not known by the Initiator.

When the Responder gets the I1 packet, it sends back an R1 packet that contains a puzzle to be solved by the Initiator. The protocol is designed so that the Initiator must do most of the calculation during the puzzle solving. This gives some protection against DoS attacks. The R1 initiates also the Diffie-Hellman procedure, containing the public key of the Responder together with the Diffie-Hellman parameters.

Once the R1 packet is received, the Initiator solves the puzzle and sends a response cookie in an I2 packet together with an IPsec SPI value and its encrypted public key to the Responder. The Responder verifies that the puzzle has been solved, authenticates the Initiator and creates the IPsec ESP SAs. The final R2 message contains the SPI value of the Responder.

The SAs between the hosts are bound to the Host Identities, represented by the HITs. However, the packets travelling in the network do not contain the actual HI information, but the arriving packet is identified and mapped to the correct SA using the Security Parameter Index (SPI) value in the IPsec header. When an outgoing packet arrives at the HI layer from the above layer, the destination HIT is verified from the IPsec SADB. If an SA matching to the destination HIT is found, the packet is encrypted using the session key associated with the SA. FIG. 3 of the accompanying drawings shows the logical and actual packet structures in the network.

A mobile host can change the location inside one access network, between different access technologies, or even between different IP address realms, for example between the IPv4 and IPv6 networks. In HIP, the application doesn't notice the change in the IP address version. The HI layer hides the change completely from upper layers. Of course, the peer node must be able to handle the location update that changes the IP version and packets must be routable using some compatible address. If a node does not have both IPv4 and IPv6 connectivity, it may use a proxy node that performs the address version conversion and provides connectivity on behalf of the node.

SUMMARY OF THE INVENTION

FIG. 4 illustrates a web "farm" that consists of several web servers. The servers are located inside a private network behind a web reverse-proxy. The reverse-proxy is a single contact point for all the servers behind it. It forwards the connection to different web servers. The server selection may be based, for example, on load balancing or other policies. In the current Internet architecture, the Internet domain name of a web site is mapped to the IP address of the web reverse-proxy. For example, www.serviceprovider.com is mapped to an IP address of a reverse-proxy that may redirect the connection to some other IP address behind it.

The scenario of FIG. 4 is a problem from the HIP point of view, because HIP is an end-to-end protocol. In HIP, connections are bound to different HITs at different end-hosts, so, in the FIG. 4 scenario, clients should establish end-to-end connections with the web servers, each having its own HI, and not with the reverse-proxy. However, all servers belonging to the same cluster should have the same cluster identity to allow the cluster to be reachable at a single address and thereby facilitate load balancing by the reverse-proxy.

One solution would be to map multiple IP addresses to a single HI at the DNS server. However, this would be difficult to manage as, whenever a single web server is added to or removed from a cluster, the administrator must update the FQDN—HITs mapping in the DNS. Another solution would be to use a single HI whilst storing the same private key at all participating computers. This is not however a scalable solution, nor is it good from the security point of view as a private key should be stored only in a single location to minimize the risk of revealing the key.

According to a first aspect of the present invention there is provided a method of establishing a Host Identity Protocol session between first and second Host Identity Protocol enabled hosts, where at least said second host is located behind a reverse-proxy, the method comprising:

providing the reverse-proxy with Diffie-Hellman public keying material of the second host;

sending said Diffie-Hellman public keying material from the reverse-proxy to the first host as part of the Host Identity Protocol base exchange procedure, this material being bound to the Host Identity of the reverse-proxy for the purpose of the Host Identity Protocol session; and at the first host, using the Host Identity of the reverse-proxy as the correspondent Host Identity for the Host Identity Protocol session, and, at the second host, using the Host Identity of the reverse-proxy as the originating Host Identity for the Host Identity Protocol session.

As will be known to the person of skill in the art, a reverse-proxy is a proxy that acts as a gateway to an http server farm or collection of other hosts by acting as the final IP address for requests coming from the outside. From an outside client's point of view, the reverse proxy is the http server.

The invention is applicable in particular to the case where the second host is a web server, being one of a number of web servers in a web server cluster or farm.

In certain embodiments of the invention, Diffie-Hellman private keying material corresponding to said Diffie-Hellman public keying material is retained only by the second host and is not provided to the reverse-proxy. Encryption/decryption and/or authentication of data packets is not performed at the reverse proxy.

In other embodiments of the invention, session keying material is provided by the second host to the reverse-proxy to allow the reverse-proxy to perform encryption/decryption and/or authentication of data packets. Preferably, said session keying material is provided to the reverse-proxy in the R2 message of the Host Identity Protocol base exchange procedure. If re-keying is to be performed between the first and second hosts, the session keying material is provided to the reverse-proxy in an UPDATE message.

Embodiments of the invention result in a separation of the server (second host) that generates the D-H material from the reverse-proxy that signs the corresponding R1 message containing the D-H TLV. The server binds its connections to the reverse-proxy's HI. The server does not need to know the private key of the reverse-proxy. As a result the communication with the server behind the proxy is transparent to the first host. A single reverse-proxy can represent several server belonging to the same cluster.

All server in the cluster can be identified using a single Host Identity (HI). An administrator can add and remove server from the cluster without having to worry about HI management or DNS updates. From a host point of view, the first host receives only one HI from the DNS that is bound the specific, e.g. web site. The host does not need to care about multiple HIs. This can leave, for example, load balancing work to the reverse-proxy that is responsible for redirecting traffic between different servers behind the reverse-proxy.

According to a second aspect of the present invention there is provided a reverse-proxy for use in establishing a Host Identity Protocol session between first and second Host Identity Protocol enabled hosts, where said second host is located behind the reverse-proxy, the proxy comprising:

means for receiving public keying material of the second host, and for storing said material;

means for sending said public keying material from the reverse-proxy to the first host as part of a Host Identity Protocol base exchange procedure, this material being bound to the Host Identity of the reverse-proxy for the purpose of the Host Identity Protocol session; and means for forwarding packets subsequently received from the first host, to the second host.

According to a third aspect of the present invention there is provided a Host Identity Protocol host arranged in use to reside behind a reverse proxy, the host comprising:

means for sending public keying material of the host to the reverse proxy;

means for participating in a Host Identity Protocol base exchange procedure with a peer host, the means using the Host Identity of the reverse proxy as the originating Host Identity for the Host Identity Protocol session.

DETAILED DESCRIPTION OF AN EMBODIMENT

Figure 1:
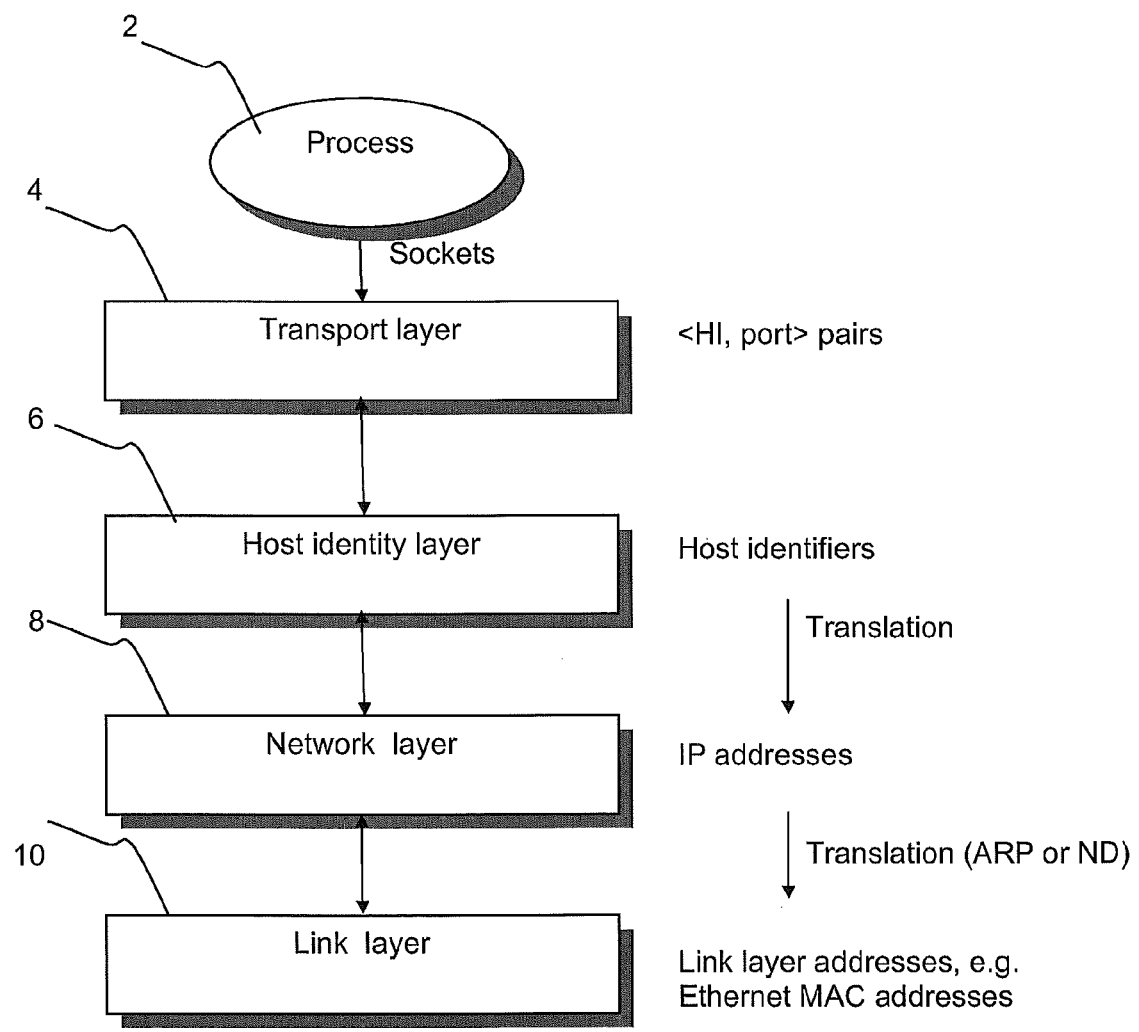
FIG. 1 illustrates diagrammatically the various layers in the Host Identity Protocol.
Figure 2:
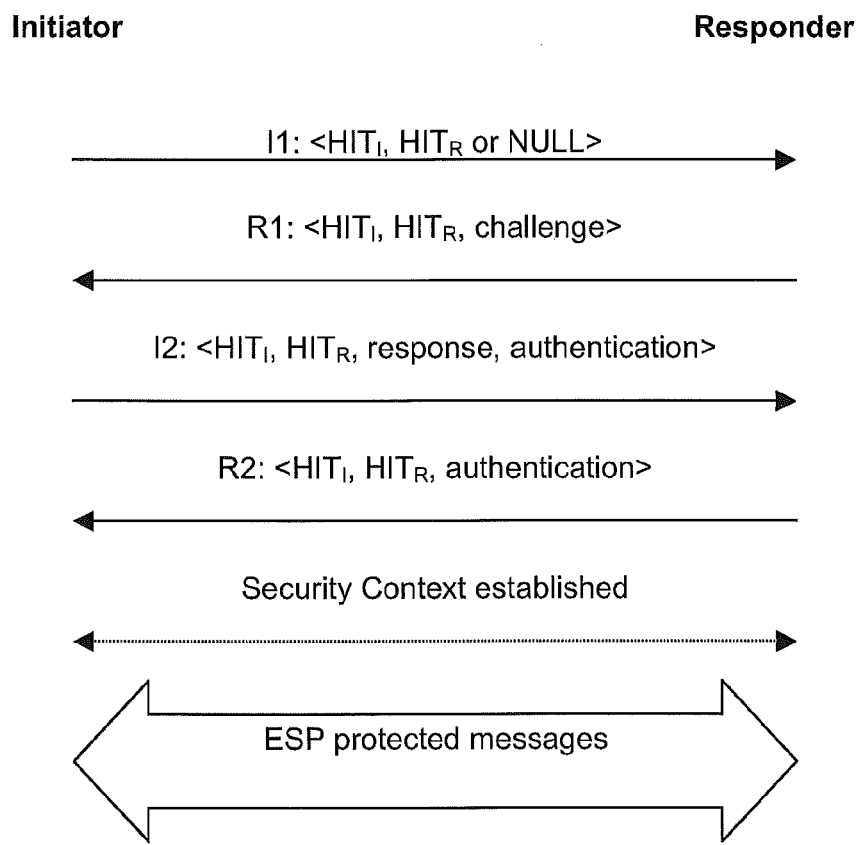
FIG. 2 illustrates the operation of the four-way handshake in the HIP protocol.
Figure 3:
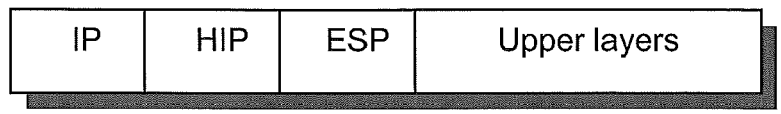
FIG. 3 shows the logical and actual packet structures in HIP.
Figure 3:
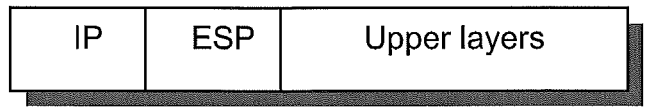
Figure 4:
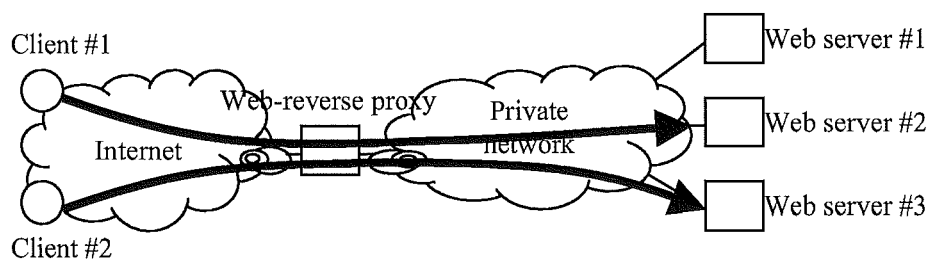
FIG. 4 illustrates schematically a web farm or cluster.

The following is an outline of a procedure for using HIP in the context of a web farm as illustrated in FIG. 4.

Figure 5:
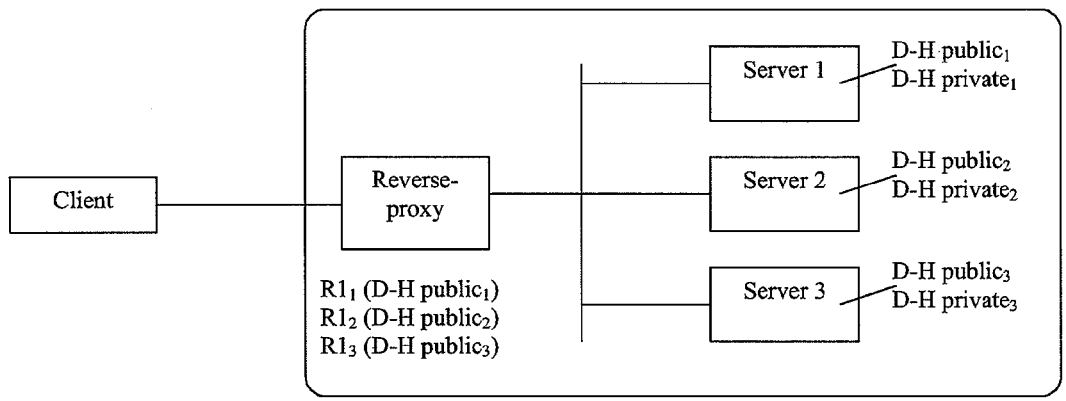
FIG. 5 illustrates schematically the sharing of public key material between a reverse-proxy web servers of the web farm of FIG. 4.

During an initialization phase, when a new web server is setup in the server farm of the private network, the new server generates its own public and private keys. Thus it gets its own Host Identity. It needs also Diffie-Hellman key material that will be used later to generate a shared secret with a peer node during the HIP Base Exchange. The new server generates the private part (D-H-private) and the public part (D-H-public). The web server registers to the server farm's trusted reverse-proxy and sends the D-H-public value to the reverse-proxy. The reverse-proxy generates an R1 packet, containing the D-H-public value of the server, and signs it with its own HI private key. The reverse-proxy thus maintains multiple R1 packets, (at least) one for each of the server nodes in the server farm. This situation is illustrated in FIG. 5.

When a client outside of the private network resolves the FQDN name of the web farm (e.g. www.serviceprovider.com), it sees the site as one server. The DNS returns to the client the IP address and the HI of the reverse-proxy. The client generates a HIT from the HI of the reverse-proxy, and then creates an I1 packet containing that HIT, and sends this to the reverse-proxy. The reverse-proxy selects a suitable web server within the private network based on some policy (e.g. load balancing), and replies to the sender of the I1 packet with the pre-signed R1 packet corresponding to the selected server. The client authenticates the signature on the R1 packet using the HI of the reverse-proxy. It then solves the puzzle in the R1 packet, generates an I2 packet containing the puzzle solution, and sends it to the reverse-proxy. The reverse-proxy verifies the puzzle solution and forwards the I2 message to the correct server behind it. The server verifies the I2 packet, generates the key material, and establishes an IPsec SA pair to be used with the client.

It will be noted that the web server does not know the HIP private key of the reverse-proxy. However, the server can bind the local connections and IPsec SAs to the reverse-proxy's HIT. In other words, the server cannot sign the HIP messages going to the client, because it does not know the proxy's HI private key, but it can use the reverse-proxy's HIT for connection bindings. The reverse-proxy signs the R1 and R2 messages with its own private key. In this way, the client does not know that it actually communicates with the server.

The server replies with the R2 message including the server's ESP SPI value. The server uses its own HI private key to sign the R2 packet. When the reverse-proxy receives the R2 packet, it verifies the server's signature. The web reverse-proxy replaces the server's signature in the R2 with its own. The R2 packet, signed by the reverse-proxy, is sent to the client. The result is that the client thinks that it communicates with the reverse-proxy, but the end to end key material is shared and IPsec traffic flows between the client and the server.

Figure 6:
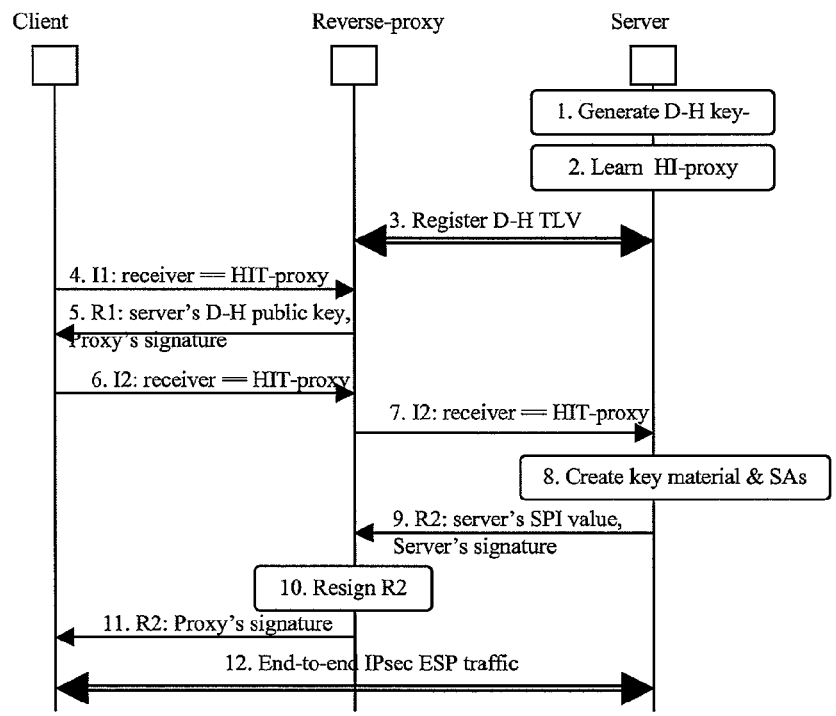
FIG. 6 is a signalling diagram illustrating in general terms signalling associated with a modified Host Identity Protocol base exchange procedure.

A detailed signalling flow for this mechanism is illustrated in FIG. 6, where the client has identity "HI-client", the reverse-proxy has identity "HI-reverse-proxy" and the server has identity "HI-server". The signalling steps are as follows:

1. A web server generates a D-H key pair. The D-H key pair consists of public and private material. The private material is stored only at the server, and the public material is sent to the proxy at the registration phase (see step 3).

2. The administrator of the cluster specifies a master reverse-proxy for the server. The server has previously learnt the HI (public key) of the reverse-proxy.

3. The server registers its D-H public material (in HIP, this is transmitted inside a DIFFIE_HELLMAN parameter called D-H TLV) to the reverse-proxy. The server uses the HIP registration exchange [draft-koponen-hip-registration-01] to register the D-H TLV to the reverse-proxy. The D-H TLV value must be signed in the registration message by the server. The reverse-proxy generates and stores an R1 message containing the D-H TLV of the server. The stored R1 message is signed with the reverse-proxy's HI private key. The reverse-proxy generates (at least) one R1 packet for each of the servers behind it. It must verify that each R1 packet that it generates has a different random I-value in the puzzle. This I-value is later used to identify the incoming I2 packet.

4. A web client decides to contact the web site (e.g. www.serviceprovider.com) and resolves the HIT and the IP address by contacting the DNS. It gets the HI and IP address for the reverse-proxy. The client generates and sends an I1 message to the reverse-proxy. The I1 contains the HIT of the reverse-proxy and is directed to the IP address of the reverse-proxy.

5. When the reverse-proxy receives an I1 message, it makes a decision as to which one of the web servers behind it will serve this client. The decision is based on local policy, e.g. depending on the current load of different servers. The reverse-proxy then selects the R1 message pre-generated for the selected server, containing the D-H public value of the server. The reverse-proxy replies to the client with this R1 message thereby providing the client with the D-H public material of the selected web server.

6. The client solves the puzzle in the R1 message, generates an I2 packet containing its D-H public material, and sends it to the reverse-proxy. The reverse-proxy checks the I-value in the puzzle (which also identifies the reverse-proxy the server that it has selected), verifies the puzzle in the I2 message, and forwards the I2 message to the correct server.

7. The server receives the I2 message. The I2 message contains the HITs of both the client and the reverse-proxy.

8. The server verifies the message using the D-H public material of the client, and generates the HIP and IPsec key material using its own D-H key material (see step 1) and client's D-H TLV. The server binds the SA pair to the HIs of the reverse-proxy and the client. The server subsequently uses the reverse-proxy's HIT to calculate packet checksums. [NB. The client is not made aware of the server's own HIT.]

9. The server sends to the reverse proxy an R2 message containing the server's SPI value. It signs the R2 packet with its own HI-server private key.

10. The reverse-proxy verifies the signature in the R2 packet, strips the server's signature off the packet, and adds its own signature using HI-reverse-proxy private key.

11. The reverse-proxy sends the resigned R2 packet to the client.

12. The result is that the client and the server share the same keying material, and that this material is known only to them (and not to the reverse-proxy). Communication with the server is however transparent to the client, and the client believes that it communicates with the proxy. The client sends IPsec ESP packets to the reverse-proxy which in turn forwards the packets to the server.

The approach described above maintains end to end security between the client and the web server. However, assuming that the link between the reverse-proxy and the web server is secure and that sharing private keys on the private network is not a problem, an alternative approach is for the web servers to delegate IPsec encryption and/or authentication keys to the reverse-proxy. When the reverse-proxy has the encryption keys, it can handle data authentication and encryption/decryption leaving the data on the link between the reverse-proxy and the web servers unprotected. When the reverse-proxy has the authentication keys, it can authenticate incoming packets thereby protecting the web servers from DoS attacks. This approach may be modified so that only authentication is performed at the reverse proxy and not/encryption decryption. This will still provide an advantageous "gatekeeping" service to the web servers.

Considering the alternative approach in more detail, when the web server wants to delegate IPsec keys to the reverse-proxy, it adds the keys to a parameter in the R2 message (modifying step 10 above). The R2 message requires new parameters for this purpose: KEY_ENCR containing encryption keys and KEY_AUTH containing authentication keys. When the reverse-proxy receives either of these parameters, it stores the keys, and removes them from the R2 packet. The R2 packet is re-signed and sent further to the client. Based on this key information, the reverse-proxy can do requested cryptographic operations. Can the reverse-proxy generate the keys instead of receiving them from the web server?

Figure 7:
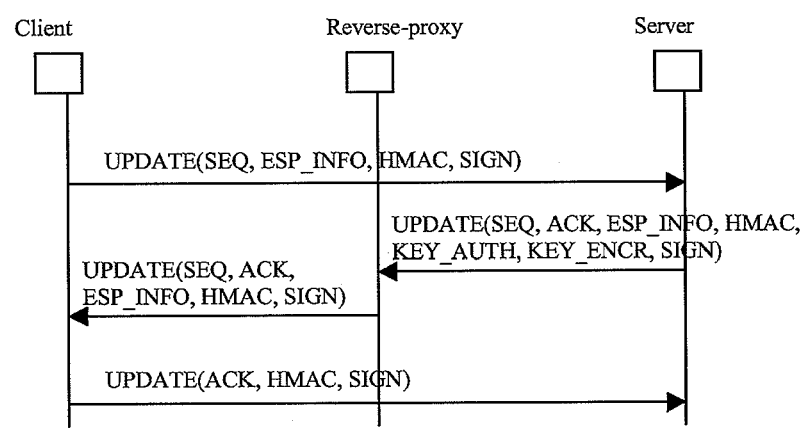
FIG. 7 is a signalling diagram illustrating in general terms signalling associated with a re-keying procedure according to an alternative embodiment of the invention.

It is possible that the client and the web server will perform re-keying using UPDATE messages. In this case, the UPDATE message from the server must contain the KEY_ENCR and/or KEY_AUTH parameters, if corresponding operations have been delegated to the reverse-proxy. The reverse-proxy stores the key information, removes these parameters, and re-signs the packet before delivering it to the Client. Because the UPDATE procedure is a three-way handshake, and either of the parties can initiate it, the message where these KEY-parameters are included depends upon who initiates the re-keying. If the client initiates it, the second UPDATE message (the only one sent by the server) contains these parameters, and if the server has initiated it, the third UPDATE message contains them. FIG. 7 illustrates the when the client initiates the re-keying process.

It will be appreciated by the person of skill in the art that various modifications may be made to the above embodiments without departing from the scope of the accompanying claims. For example, the approach described may be used to provide a general addressing and routing mechanism between clients. As such, the web server may be any HIP enabled client located behind a reverse-proxy. However, such implementations may require an additional authentication and authorisation process between the client (located behind the reverse-proxy) and the reverse-proxy.

What is claimed is:

1. A method of establishing a Host Identity Protocol session between first and second Host Identity Protocol enabled hosts, where at least said second host is located behind a reverse-proxy, the method comprising:
providing the reverse-proxy with Diffie-Hellman public keying material of the second host;
sending said Diffie-Hellman public keying material from the reverse-proxy to the first host as part of a Host Identity Protocol base exchange procedure and using the Diffie-Hellman public keying material to establish a pair of security associations between the first and second hosts, the security associations being bound to Host Identities of the reverse-proxy and said second host for the purpose of the Host Identity Protocol session; and
at the first host, using the Host Identity of the reverse-proxy as the correspondence Host Identity for the Host Identity Protocol session, and, at the second host, using the Host Identity of the reverse-proxy as the originating Host Identity for the Host Identity Protocol session wherein the first and second hosts use Host Identity Protocol.

2. A method according to claim 1, where said second host is a web server, being one of a number of web servers in a web server cluster or farm.

3. A method according to claim 1, where Diffie-Hellman private keying material corresponding to said Diffie-Hellman public keying material is retained only by the second host and is not provided to the reverse-proxy.

4. A method according to claim 1, where session keying material is provided by the second host to the reverse-proxy to allow the reverse-proxy to perform at least one of encryption, decryption, or authentication of data packets.

5. A method according to claim 4, where said session keying material is provided to the reverse-proxy in an R2 message of the Host Identity Protocol base exchange procedure.

6. A method according to claim 4, where re-keying is performed between the first and second hosts by providing the session keying material to the reverse-proxy in an UPDATE message.

7. A reverse-proxy for use in establishing a Host Identity Protocol session between first and second Host Identity Protocol enabled hosts, where said second host is located behind the reverse-proxy, the proxy comprising:
 means for receiving Diffie-Hellman public keying material of the second host, and for storing said Diffie-Hellman public keying material;
 means for sending said Diffie-Hellman public keying material from the reverse-proxy to the first host as part of a Host Identity Protocol base exchange procedure, whereby the first host can uses the Diffie-Hellman public keying material to establish a pair of security associations with the second host with the security associations being bound to the Host Identities of the reverse-proxy and the first host for the purpose of the Host Identity Protocol session; and
 means for forwarding packets subsequently received from the first host, to the second host wherein the first and second hosts use Host Identity Protocol.

8. A Host Identity Protocol host arranged in use to reside behind a reverse proxy, the host comprising;
 means for sending Diffe-Hellman public keying material of the host to the reverse proxy;
 means for participating in a Host Identity Protocol base exchange procedure with a peer host, where the means for participating uses the Host Identity of the reverse proxy as an originating Host Identity for a Host Identity Protocol session, and using said Diffie-Hellman public keying material to establish a pair of security associations with said peer node, the security associations being bound to said Host Identities of the reverse proxy and said peer host wherein the first and second hosts use Host Identity Protocol.

9. A proxy according to claim 7, where said second host is a web server, being one of a number of web servers in a web server cluster or farm.

10. A proxy according to claim 7, where Diffie-Hellman private keying material corresponding to said Diffie-Hellman public keying material is retained only by the second host and is not provided to the reverse-proxy.

11. A proxy according to claim 7, where session keying material is provided by the second host to the reverse-proxy to allow the reverse-proxy to perform at least one of encryption, decryption, or authentication of data packets.

12. A proxy according to claim 11, where said session keying material is provided to the reverse-proxy in an R2 message of the Host Identity Protocol base exchange procedure.

13. A proxy according to claim 11, where re-keying is performed between the first and second hosts by providing the session keying material to the reverse-proxy in an UPDATE message.

14. A host according to claim 8, where said host is a web server, being one of a number of web servers in a web server cluster or farm.

15. A host according to claim 8, where Diffie-Hellman private keying material corresponding to said Diffie-Hellman keying public material is retained only by the host and is not provided to the reverse-proxy.

16. A host according to claim 8, where session keying material is provided by the host to the reverse-proxy to allow the reverse-proxy to perform at least one of encryption, decryption, or authentication of data packets.

17. A host according to claim 16, where said session keying material is provided to the reverse-proxy in an R2 message of the Host Identity Protocol base exchange procedure.

18. A host according to claim 16, where re-keying is performed between the host and the peer host by providing the session keying material to the reverse-proxy in an UPDATE message.

* * * * *